US007346436B2

(12) United States Patent
Altmann et al.

(10) Patent No.: US 7,346,436 B2
(45) Date of Patent: Mar. 18, 2008

(54) MODULAR SWITCH AND CONTROL SYSTEM FOR USE IN A MOTOR VEHICLE

(75) Inventors: Markus Altmann, Moos-Bankholzen (DE); Dieter Bornhorst, Stockach (DE); Christoph Schostok, Steisslingen (DE); Karl-Heinz Wohlfahrt, Bodman-Ludwigshafen (DE)

(73) Assignee: TRW Automotive Electronics & Components GmbH & Co Kg, Radolfzell (DE)

(*) Notice: Subject to any disclaimer, the term of this patent is extended or adjusted under 35 U.S.C. 154(b) by 733 days.

(21) Appl. No.: 10/913,898

(22) Filed: Aug. 6, 2004

(65) Prior Publication Data

US 2005/0075741 A1 Apr. 7, 2005

(30) Foreign Application Priority Data

Aug. 8, 2003 (DE) ................................ 103 36 582

(51) Int. Cl.
*G05D 1/00* (2006.01)

(52) U.S. Cl. ................... 701/1; 701/2; 701/29; 701/36; 700/17; 700/36; 340/5.1; 340/825.72

(58) Field of Classification Search .................... 701/1, 701/2, 29, 36; 700/17, 83; 361/728; 340/5.1, 340/825.72

See application file for complete search history.

(56) References Cited

U.S. PATENT DOCUMENTS 4,346,419 A * 8/1982 Janniello ....................... 361/2
4,757,525 A * 7/1988 Matthews et al. ....... 379/88.26
4,777,378 A * 10/1988 Talbot ....................... 307/10.1
5,262,602 A * 11/1993 Mattson .................... 200/52 R
5,523,633 A * 6/1996 Imaizumi et al. .............. 361/3
5,866,862 A * 2/1999 Riffil et al. ................. 361/728
6,635,972 B1 10/2003 Barthel et al.
2006/0287783 A1* 12/2006 Walker ........................ 701/29

FOREIGN PATENT DOCUMENTS

DE 4328663 6/1994
DE 29816277 1/1999
DE 19845135 4/1999

* cited by examiner

*Primary Examiner*—Thomas Black
*Assistant Examiner*—McDieunel Marc
(74) *Attorney, Agent, or Firm*—Tarolli, Sundheim, Covell & Tummino LLP

(57) ABSTRACT

A modular switch and control system for use in a motor vehicle is provided, that is easily and flexibly adapted to the particular needs and requires no additional wiring for added modules. The modular switch and control system comprises a main switch module and optional satellite modules of different types. The main and satellite modules have separate housings with matching engagement structures permitting each satellite module to be fitted to one side of the main module. Each satellite module is electrically connected with the main module through matching male and female connectors. Each satellite module is provided with electrical coding device accessible through the connectors and permitting each satellite to be provided with a code indicative of the module type. The main module further includes detection device for accessing the coding device and detecting the type of connected satellite modules, and processing device for processing signals received from connected satellite modules and for generating control signals. The control signals are preferably applied through an appropriate interface to a bus installed in the vehicle, e.g. a CAN bus or a LIN bus.

10 Claims, 3 Drawing Sheets

MODULAR SWITCH AND CONTROL SYSTEM FOR USE IN A MOTOR VEHICLE

The present invention relates to a modular switch and control system for use in a motor vehicle.

Motor vehicles usually have a rotary light switch for operating various lighting functions such as upper and lower beams, parking light and fog light. Other control elements may be provided for operating lighting related functions such as a range adjustment for the lower beams, an adjustment of the instrument illumination level or an activation of a headlamp glass washer. Such other control elements may be push button operated-switches or potentiometers that are operated through a rotary wheel, for example. They are usually accommodated in the instrument panel in positions next to the light switch.

Conventional switch and control systems for lighting and lighting related functions require complex wiring and assembly operations, all the more because some functions and related operating elements are optional and may only be installed in higher priced vehicles.

The present invention provides a modular switch and control system for use in a motor vehicle, that is easily and flexibly adapted to the particular needs and requires no additional wiring for added modules. Specifically, the modular switch and control system of the invention comprises a main switch module and optional satellite modules of different types. The main and satellite modules have separate housings with matching engagement structures permitting each satellite module to be fitted to one side of the main module. Each satellite module is electrically connected with the main module through matching male and female connectors. Each satellite module is provided with electrical coding means accessible through the connectors and permitting each satellite to be provided with a code indicative of the module type. The main module further includes detection means for accessing the coding means and detecting the type of connected satellite modules, and processing means for processing signals received from connected satellite modules and for generating control signals. The control signals are preferably applied through an appropriate interface to a bus installed in the vehicle, e.g. a CAN bus or a LIN bus.

In the inventive switch and control system, the main module, which usually incorporates a rotary light switch, can be combined with optional satellite modules without the need for additional wiring. A satellite module, when present, is detected and identified by the main module. Signals from any detected satellite module are processed by a digital controller and converted into control signals applied to a bus in the vehicle through an interface of the main module.

Coding of the optional satellite modules can be accomplished in an easy way by means of resistive voltage dividers. The main module identifies a connected satellite module based on a voltage detected at the resistive voltage divider. Based on the detected type of satellite module, the main module converts any signals from a satellite module into appropriate digital control signals applied to the bus of the vehicle.

Further advantages and details of the invention will become apparent from the following description of preferred embodiments with reference to the appending drawings. In the drawings.

Figure 1:
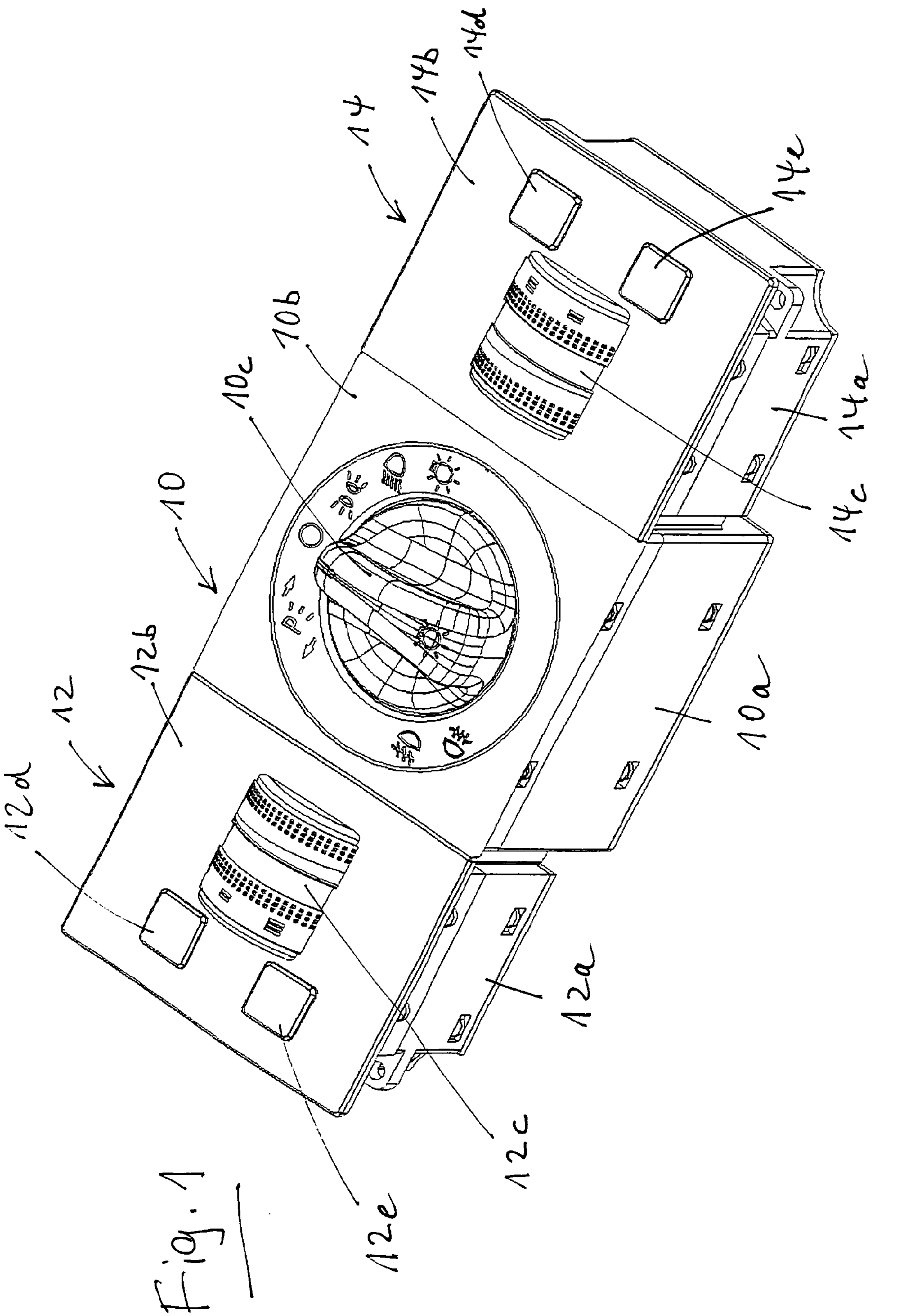
FIG. 1 is a perspective view of one embodiment of the modular switch and control system with a main module and two satellite modules.

With reference now to FIG. 1, a switch and control system for a motor vehicle is shown which comprises a central main module 10 with a rotary light switch and two satellite modules 12, 14 connected at two opposed sides to main module 10. Each of the modules 10, 12 and 14 has a separate housing 10*a*, 12*a* and 14*a*, respectively, and a front panel 10*b*, 12*b*, 14*b*, respectively. Each of the modules 10, 12 and 14 has one or more operating elements. The front panels 10*b*, 12*b* and 14*b* together fit into a recess of the instrument panel in the particular vehicle for which the system is intended. Module 10 has a knob 10*c* for manual actuation of the associated rotary light switch (not shown). Module 12 has a rotary wheel 12*c* for actuation of a potentiometer (FIG. 5) and a pair of push buttons 12*d*, 12*e*. Module 14 also has a rotary wheel 14*c* for actuation of a potentiometer (not shown) and a pair of push buttons 14*d*, 14*e*.

The satellite modules 12, 14 are optional. Satellite module 12 in the example considered is a control module mainly for a range control adjustment of the lower beams. Satellite module 14 in the example considered is a control module mainly for an adjustment of the illumination level of the instrument panel in the vehicle. Both satellite modules 12 and 14 may have additional control elements such as push buttons 12*d*, 12*e* in module 12 and push buttons 14*d*, 14*e* in module 14. The main module 10 is capable of detecting the presence (or not) of each satellite module and of receiving electrical signals from each switch or potentiometer in a connected satellite module to issue appropriate control signals on a system bus of the vehicle, as will be disclosed in more detail.

Figure 2:
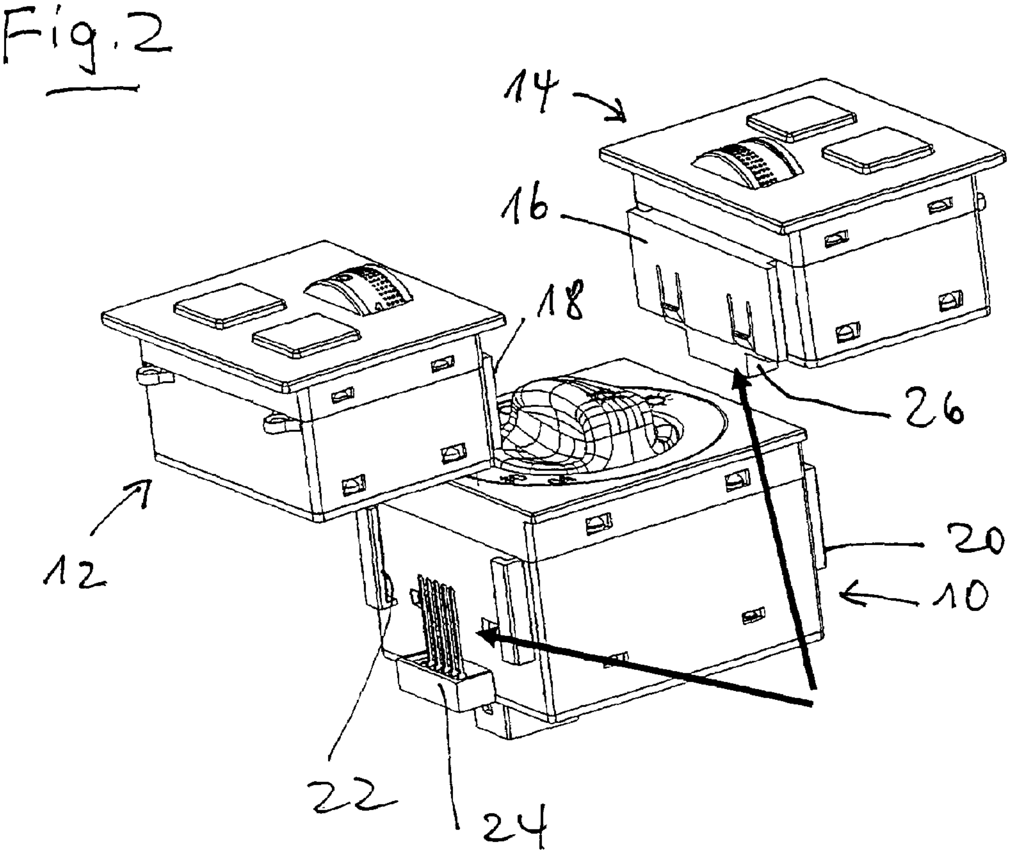
FIG. 2 is a perspective view illustrating the mechanical and electrical association of the main and satellite modules.
Figure 3:
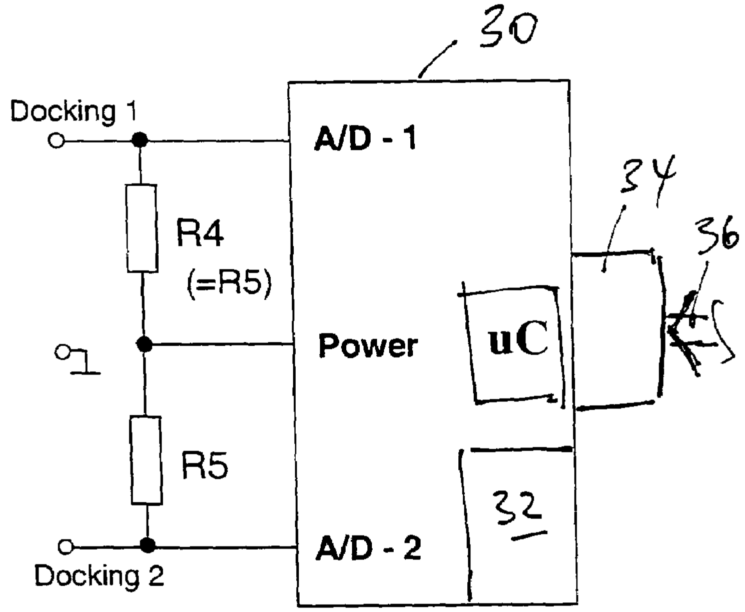
FIG. 3 is a block diagram of a microcontroller-based detection and processing unit of the main module.

With reference now to FIG. 2, it is seen that the assembly mode of modules 10, 12 and 14 is both mechanical and electrical. Satellite modules 12 and 14 are both provided with a male mechanical connector element 16 and 18, respectively, that fits into a corresponding mechanical female connector 20, 22, respectively, on the corresponding side of the main module. Main module 10 also has a male electrical connector 24 for cooperation with a corresponding female electrical connector on satellite module 12. Likewise, main module 10 also has a male electrical connector for cooperation with a corresponding female electrical connector 26 on satellite module 14. When modules 10, 12 and 14 are assembled by simply fitting them onto each other, they are mechanically engaged and latched, and simultaneously also interconnected electrically.

The main module 10 incorporates "intelligence" as materialized by a digital microcontroller 30 with a controller core "µC", an associated memory 32 and an interface 34 to a bus system 36 installed in the vehicle. Microcontroller 30 has a first analog input "A/D 1" for connection to a first satellite module, a second analog input "A/D 2" for connection to a second satellite module and a supply voltage terminal "Power". The latter terminal is connected to input A/D 1 through a resistor R4 and to input "A/D 2" through a resistor R5, both resistors R4, R5 being equal in resistance value. Resistors R4 and R5 each are part of a resistive voltage divider that is supposed to be completed by one or more resistors in a connected satellite module.

Figure 4:
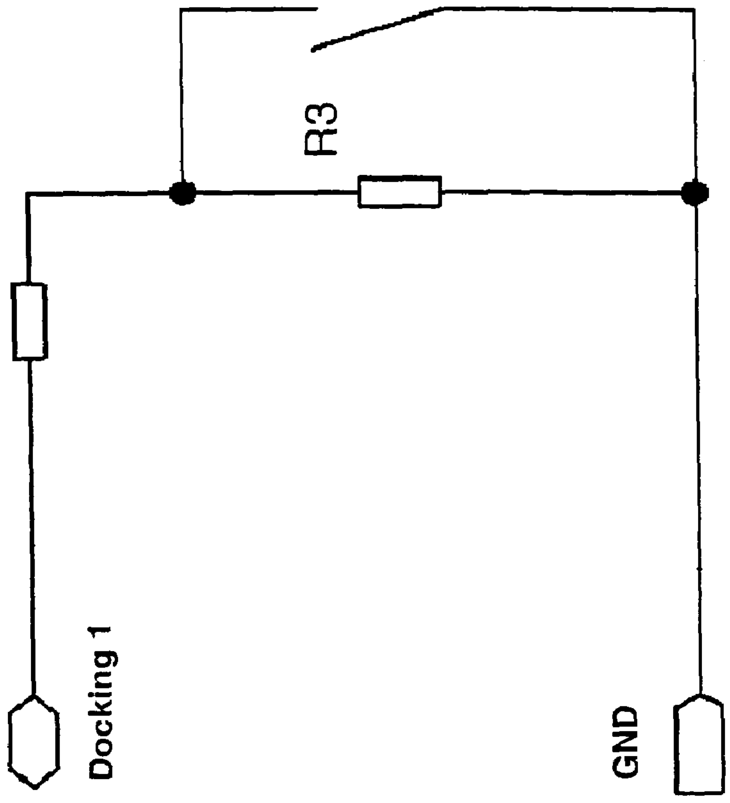
FIG. 4 is a schematic circuit diagram of a first satellite module.

Referring to FIG. 4, satellite module 12 has a docking terminal "Docking 1" and a ground terminal "GND". Connected in series between both terminals are resistors R2 and R3. A switch SW is connected across (in parallel with) resistor R3. Switch SW may be operated by a push button in satellite module 12.

Figure 5:
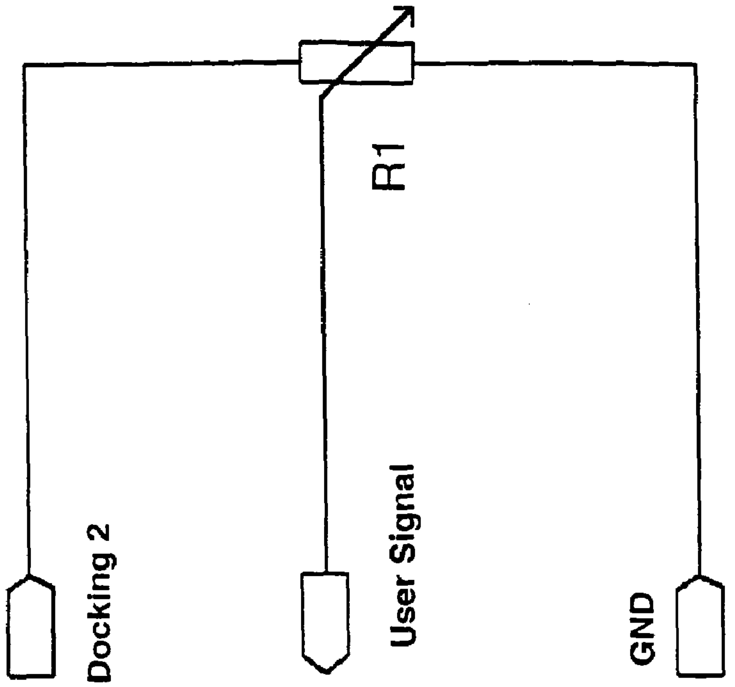
FIG. 5 is a schematic circuit diagram of a second satellite module.

Referring to FIG. 5, satellite module 14 has a docking terminal "Docking 2", a ground terminal "GND" and a terminal "User Signal". A potentiometer P is connected between terminals "Docking 2" and "GND" and has a tap connected to terminal "User Signal".

It should be understood that any satellite module can have one or more switches and one or more potentiometers, as required for a particular application. The main module is aware of satellite module types and the respective functionality provided. All possible satellite module types are coded by unambiguously associated resistive voltage divider ratios. These resistive voltage divider ratios are stored in memory 32 of digital microcontroller 30. By detecting the voltage drop at terminal "A/D 1" or "A/D 2", and matching the detected value with the contents of memory 32, the microcontroller 30 can identify each connected satellite module and associated functionality.

In operation, the microcontroller 30 watches both of its inputs "A/D 1" and "A/D 2", identifies each connected satellite module and receives electrical signals from each connected module. The received signals are converted into appropriate control signals which are applied to bus 36 through interface 34. It should be understood that bus 36 is connected to driver circuitry installed within the vehicle for execution of corresponding controls.

The invention claimed is:

1. A modular switch and control system for use in a motor vehicle, comprising a main switch module and optional satellite modules of different types, wherein the main and satellite modules have separate housings with matching engagement structures permitting each satellite module to be fitted to one side of the main module, each satellite module being electrically connected with the main module through matching male and female connectors, each satellite module being provided with electrical coding means accessible through said connectors and permitting each satellite to be provided with a code indicative of the module type, and the main module including detection means for accessing the coding means and detecting the type of connected satellite modules and processing means for processing signals received from connected satellite modules and generating control signals.

2. The modular switch and control system of claim 1, wherein the electrical coding means include a resistive voltage divider and the code indicative of a module type is the dividing ratio of the voltage divider.

3. The modular switch and control system of claim 2, wherein the resistive voltage divider comprises a first resistor connected to a supply voltage terminal of the main module and at least a second resistor connected in series with the first resistor, and the detection means detects a voltage drop at the interconnection node between the first and second resistors.

4. The modular switch and control system of claim 3, wherein the main module includes a digital microcontroller with one analog input for each optional satellite module and with a memory for storing predetermined values of different voltage levels each associated with a different type of satellite module, said detection means and said processing means being materialized by said digital controller.

5. The modular switch and control system according to claim 4, wherein the digital microcontroller is connected to a bus of the vehicle.

6. The modular switch and control system of claim 5, wherein the digital microcontroller of the main module processes voltage signals received from the satellite modules and generates control signals applied to the bus of the vehicle through an interface.

7. The modular switch and control system according to claim 3, wherein the push button-operated switch is connected across a third resistor which is connected in series with the second resistor.

8. The modular switch and control system according to claim 1, wherein the main module includes a rotary light switch.

9. The modular switch and control system according to claim 1, wherein the optional satellite modules include at least one module with at least one push button-operated switch.

10. The modular switch and control system according to claim 1, wherein the optional satellite modules include at least one module with at least one potentiometer operated by a rotary wheel.

* * * * *